United States Patent [19]

Emori

[11] Patent Number: 4,956,651

[45] Date of Patent: Sep. 11, 1990

[54] IMAGE FORMING APPARATUS WHICH SHEET DETECTION AND TIMING CONTROL

[75] Inventor: Kiyoshi Emori, Osaka, Japan

[73] Assignee: Minolta Camera Kabushiki Kaisha, Osaka, Japan

[21] Appl. No.: 213,821

[22] Filed: Jun. 30, 1988

[30] Foreign Application Priority Data

Jul. 1, 1987 [JP] Japan ................................ 62-165829
Jul. 1, 1987 [JP] Japan ................................ 62-165830
Aug. 31, 1987 [JP] Japan ................................ 62-218153

[51] Int. Cl.[5] ...................... G01D 15/14; G03G 15/00

[52] U.S. Cl. .................................... 346/108; 346/134; 355/316

[58] Field of Search ........................ 346/108, 134, 160; 355/35 H, 14 SH, 316, 308, 309, 313, 317

[56] References Cited

U.S. PATENT DOCUMENTS

| | | | |
|---|---|---|---|
| 4,048,666 | 9/1977 | Irie et al. | 355/14 R |
| 4,059,833 | 11/1977 | Kitamura et al. . | |
| 4,451,136 | 5/1984 | Tanioka et al. . | |
| 4,461,564 | 7/1984 | Ikenoue . | |
| 4,492,455 | 1/1985 | Kawai | 346/134 |
| 4,541,711 | 9/1985 | Takahashi . | |
| 4,561,767 | 12/1985 | Aoki et al. | 355/35 H |

FOREIGN PATENT DOCUMENTS

| | | |
|---|---|---|
| 0212781 | 3/1987 | European Pat. Off. . |
| 58-58563 | 4/1983 | Japan . |
| 59-86065 | 5/1984 | Japan . |

*Primary Examiner*—Mark J. Reinhart
*Attorney, Agent, or Firm*—Burns, Doane, Swecker & Mathis

[57] ABSTRACT

An image forming apparatus provided with a control circuit disposed at a front position of transfer section for correcting the timing of signal emission for turning on register rollers and also for starting exposure for image formation. The control circuit corrects the timing of signal emission basing on the time measured from signal emission to the time when the leading edge of a paper sheet reaches a sensor disposed at a rear position of the register rollers. The correction is made every time when a predetermined number of sheets are fed or an average value based on a predetermined number of samplings is obtained or power supply is turned on. The correction is further made by memorizing the data practically measured on the number of sheets fed to the transfer section from each one of paper feed positions.

15 Claims, 15 Drawing Sheets

IMAGE FORMING APPARATUS WHICH SHEET DETECTION AND TIMING CONTROL

BACKGROUND OF THE INVENTION

The present invention relates to an image forming apparatus in a copying machine, printing machine and the like and more particularly, to an image forming apparatus which is arranged to correct a dislocation of the leading edge of a paper sheet to correspond with the position of an image.

In a conventional image forming apparatus, the timing for turning on register rollers which are provided for feeding a paper sheet and the timing for starting exposure are predetermined so as to always maintain a predetermined correlative relations between the edge of a paper sheet and the position of an image.

Referring now to FIG. 4, designated by numeral 1 is a photosensitive drum and to the predetermined position of the surface of which laser beam 2 is irradiated for exposure. On a paper feed path leading to transfer section which is disposed around the photosensitive drum, paper feed rollers 4, first paper sensor 5, register rollers 6, second paper sensor 7, transfer and separation chargers 8 are sequentially disposed in the order described. When the distance a-d is set with system speed X as shown in FIG. 4, the time T (time for movement shown by slant lines) required for the register rollers turning on after starting exposure comes out;

$$T=(a-c-d)/X..... \quad (1)$$

as far as computation goes.

However, in a practical movement of a paper sheet, the paper can not be carried just as per the calculation made above because of various causes arising from inconstant start and stop of the register rollers, variable conditions when the paper dashes to enter into the register rollers. Besides, there is delicate differences in functioning of each machine with another difference arising from the period of time the machine used, thereby causing dislocation of the leading edge of the paper to the position of an image when transfer is made.

In order to avoid such mechanical disagreement, U.S. Pat. No. 4,059,833 discloses a device which is arranged to either turn on register rollers or start exposure by use of basic signals. A time measuring means is provided therein for measuring the time after the basic signal is emitted, and by the output from the time measuring means, exposure is started or register rollers are turned on, and the positions of a paper sheet and an image is corresponded by adjusting the set value of the time measuring means. However, such device known already require troublesome work for the adjustment once the positions of a paper and an image became not to correspond to each other.

SUMMARY OF THE INVENTION

The main object of the present invention is to provide an image forming apparatus which includes functions capable of correcting the positions of leading edge of a paper sheet by automatically correlating the positions of the paper and an image whenever necessary without having any manual labor for adjustment.

Another object of the present invention is to provide an image forming apparatus with functions to correct the timing of a paper feeding or exposure starting basing on the time practically measured from timing signal emission which is correlated with paper feeding by register rollers up to arrival of the leading edge of a paper sheet at the position of a sensor, thereby enabling to automatically correspond to the position of a paper with that of an image without having complicated manual labor for adjustment even though there occurred inconstant start and stop of register rollers, variable conditions when the paper dashes to enter into the rollers. Any inconvenience of preparing data for unexpected phenomena can thus be eliminated.

A further object of the present invention is to provide an image forming apparatus which is capable of properly correcting the timing for paper feeding and the timing for starting exposure even if there occurred changes in the condition of paper feeding by using a data of average value obtained by a plurality of samplings and renewing the data with a data newly obtained.

A still further object of the present invention is to provide an image forming apparatus with functions to correct the timing of paper feeding on each paper feed position or start of exposure basing on the time practically measured from timing signal emission which is correlated with paper feeding by register rollers up to arrival of the leading edge of a paper sheet at the position of a sensor, which is memorized by each paper feed position, thereby enabling to automatically and accurately correspond the position of a paper sheet with that of an image without having complicated manual labor for adjustment even though there occurred inconstant start and stop of register rollers, various conditions when paper dashes to enter into the rollers. Any inconvenience of preparing data for unexpected phenomena can thus be eliminated.

Further objects and advantages of the present invention will be apparent from the following description, reference being had to the accompanying drawings.

BRIEF DESCRIPTION OF THE DRAWINGS

It is to be noted that like parts are designated by like reference numerals throughout the accompanying drawings.

DETAILED DESCRIPTION OF THE INVENTION

Figure 1:
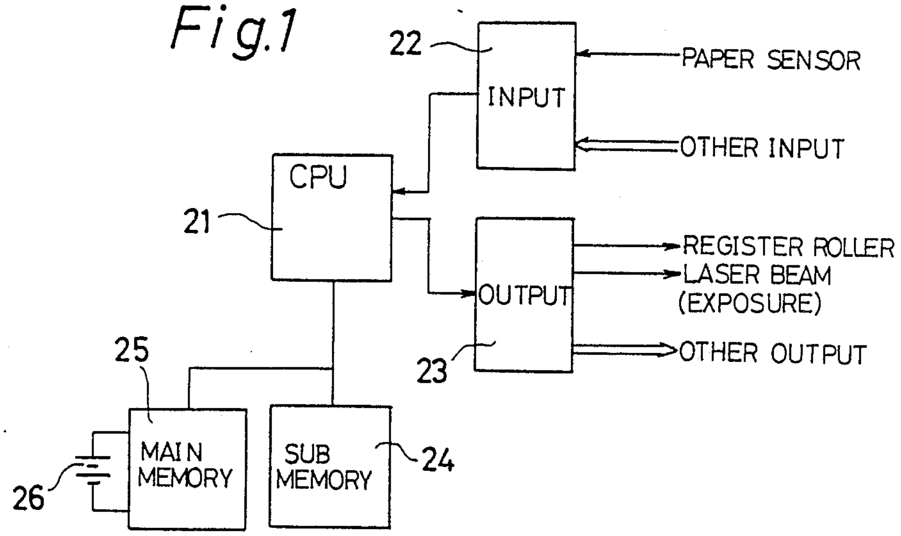
FIG. 1 is a block diagram of a control circuit of the first embodiment of the present invention.

The embodiments of the present invention will now be described below referring to the drawings.

FIGS. 1 through 11 illustrate the first embodiment of the present invention which is applied to a laser beam printer.

Figure 3:
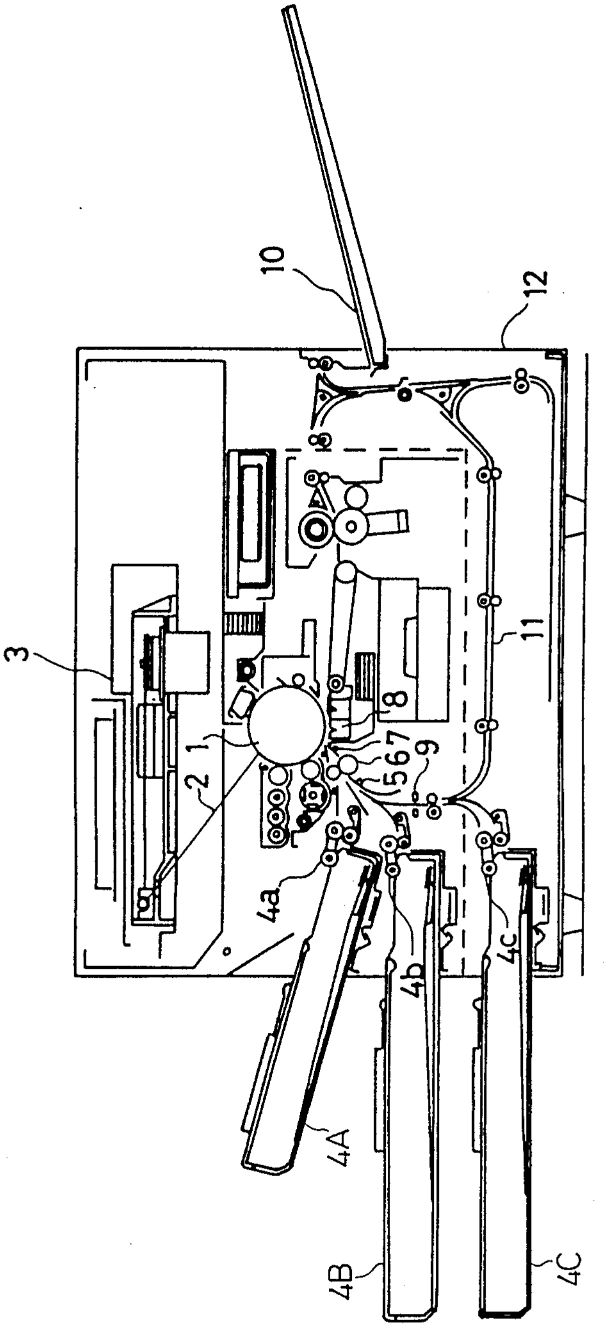
FIG. 3 is a sectional view of a laser beam printer which is controlled by the control circuit of FIG. 1.

The whole structure of the laser printer is shown in FIG. 3 in which designated by numeral 1 is a photosensitive drum onto which laser beam 2 is irradiated from an exposure device 3. The laser beam 2 is generated in compliance with an image signal, thereby forming an electrostatic latent image onto a photosensitive drum 1 corresponding to the image signal.

At the left side of the drum 1, paper feed positions provided with paper feed rollers 4a–4c which correspond to upper, middle and lower paper cassette 4A–4C are disposed.

Paper sheets passed through the paper rollers 4a–4c are fed to transfer and separation chargers 8 via first paper sensor 5, register rollers 6 and second paper sensor 7. Designated by numeral 10 is a paper discharge tray, 11 another paper feed path, 12 a unit for composite and double-sided images. Numeral 9 shows the third paper sensor which detects the paper fed again through the another paper feed path 11.

Figure 4:
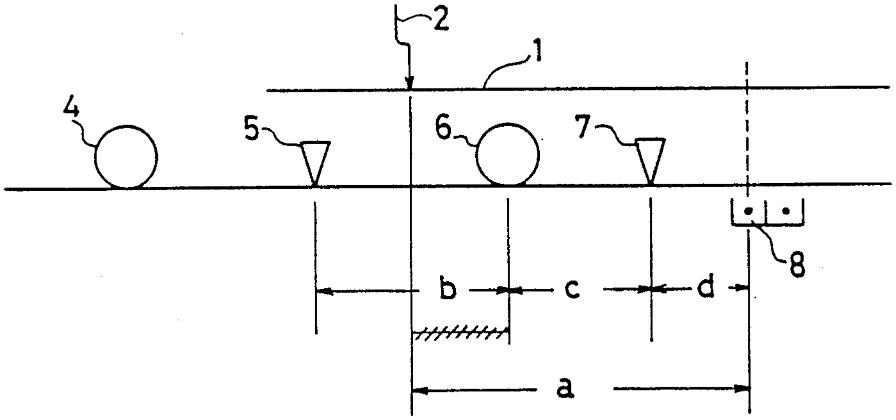
FIGS. 4 and 5 are diagram explanatory of timing for paper feeding and exposure of the printer in FIG. 3.
Figure 5:
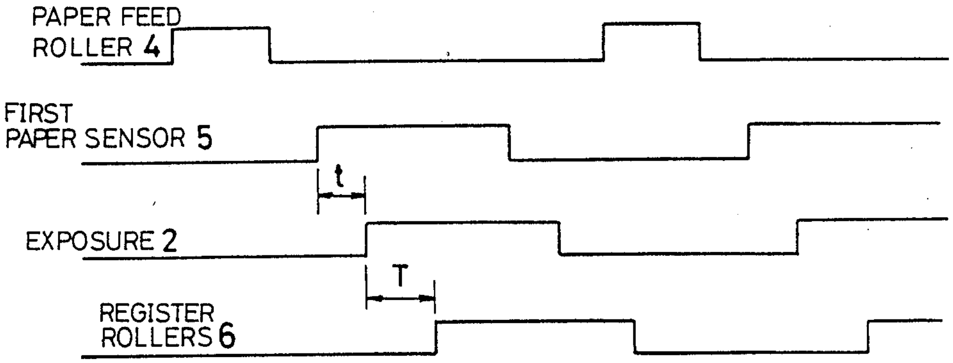

As shown in FIGS. 4 and 5, the timing for exposure is set to start by the laser beam 2 T time after the first paper sensor 5 detected the leading edge of the paper passed through the paper feed rollers 4a-4c and then the register rollers 6 are turned on T time after the exposure started, wherein the T time is automatically corrected.

The composition of a control device will now be described referring to FIGS. 1 and 2. In FIG. 1, various input port 22 and output port 23 are provided for CPU 21 which controls various pieces of information, and the CPU 21 is arranged to make direct access to submemory 24 and also to main memory 25.

Figure 2:
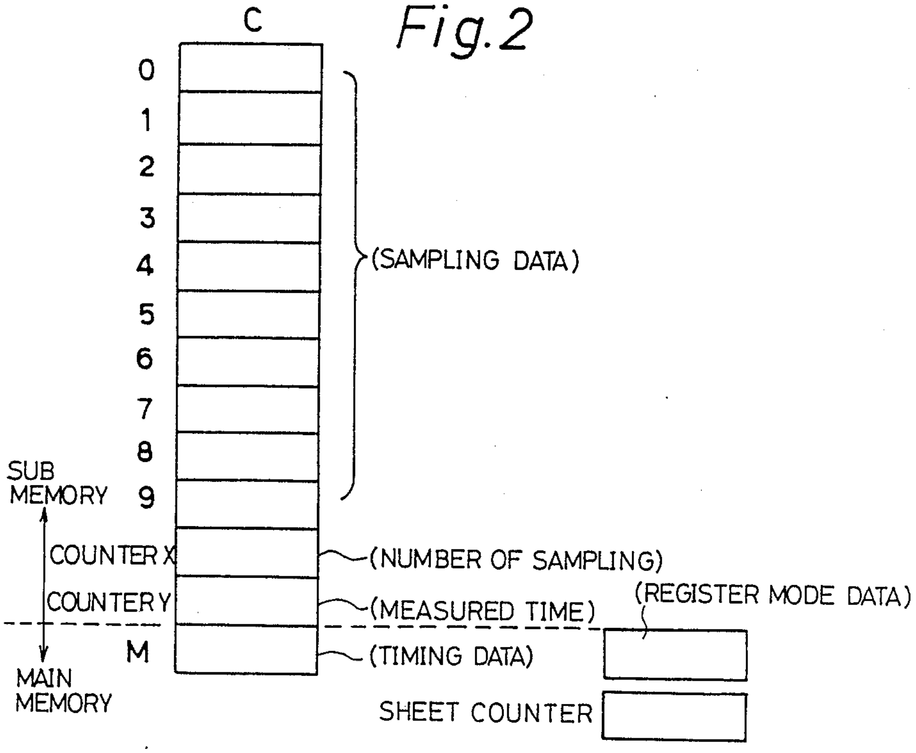
FIG. 2 is a diagram explanatory of a memory banking in the circuit control of FIG. 1

As shown in FIG. 2, the submemory 24 is provided with memory bank (C–0)–(C–9) composed of 10 byte for storing sampling data, basically for 10 samplings, while the main memory 25 has memory bank (C-M) which is composed of 1 byte for storing the timing data which turns on the register rollers 6.

The submemory 24 is further provided with a memory bank for a counter X which counts the number of samplings and a counter Y which is used for storing the time actually measured. The main memory 25 is further provided with a memory bank for storing mode data for register processing, and a sheet-number counter for always storing a series of sheet numbers printed. The main memory 25 is backed up by a battery power 26, and the data stored are maintained even if the power is turned off and turned on again. The CPU 21 of the control circuit is also connected with other input and output for controlling the movement of the whole unit.

Figure 6:
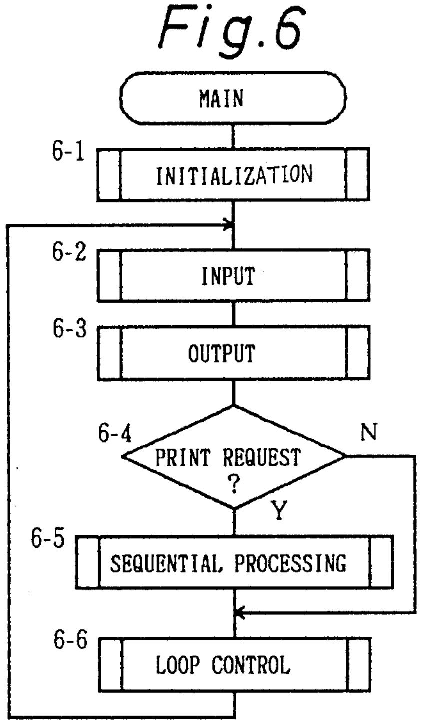
FIG. 6 is a flow chart illustrating a main routine of movement control in the control circuit in FIG. 1.
Figure 7:
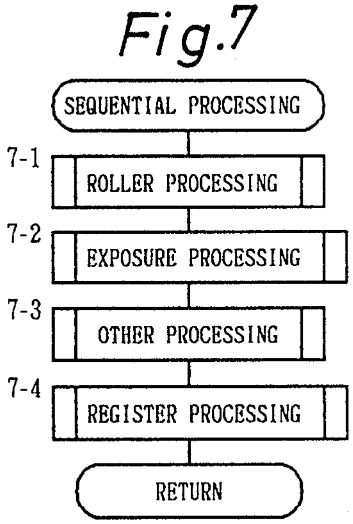
FIG. 7 is a flow chart showing subroutine of sequential processing in the main routine of FIG. 6.

The movement of the composition will now be described with reference to the flow chart illustrated in FIGS. 6 through 11. FIG. 6 shows a schematic main routine. First, initialize by clearing CPU 21 and memories 24, 25 (6-1), thereat the counters X and Y are cleared respectively and register mode data is set at '3'. In the memory bank (C-M) of the main memory 25, the timing data which was obtained by preliminary calculation is stored which covers the time from starting exposure to the regiser rollers are turned on, thereafter getting into loop procedure with predetermined time. Basically, input procedure (6-2) and output procedure (6-3) are executed, and depending on the judgement for print request (6-4), branch instruction is given either for sequential procedure or for bypass procedure. The first loop procedure is completed via loop control (6-6), thereafter return to input procedure (6-2).

The sequential processing described above is shown in FIG. 7 wherein timing processing (7-1) for onoff of various rollers, exposure processing (7-2) and other processing for sensor, etc.(7-3) are executed, and register correction processing (7-4) is executed.

Figure 8:
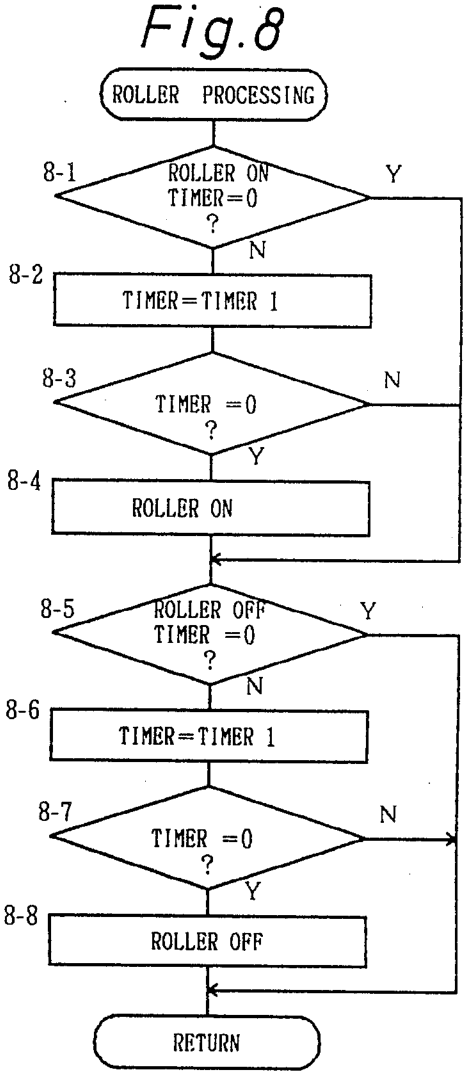
FIG. 8 is a flow chart illustrating a subroutine of roller processing in the subroutine in FIG. 7.

Processing for various rollers will now be described referring to FIG. 8 wherein timing data area provided for various rollers judges roller on timer and roller off timer as to whether they are '0' or not (8-1) (8-5), and count down successively (8-2) (8-6), and at the time when the roller on timer and the roller off timer became "0"(8-3) (8-7), on (8-4) or off (8-8) of each roller is executed.

Figure 9:
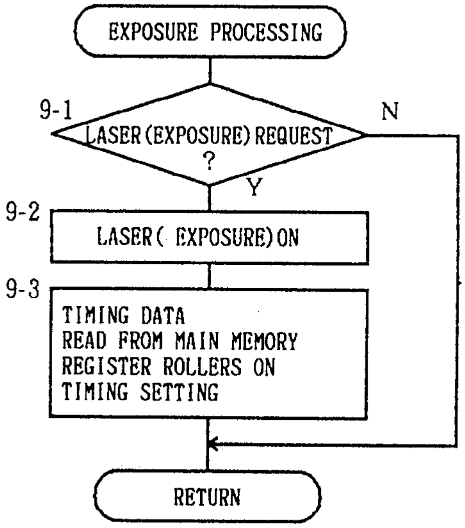
FIG. 9 is a flow chart showing a subroutine of exposure processing in the subroutine in FIG. 7.

Exposure processing will be described with reference to FIG. 9. Judgment is made as to whether exposure request was received or not (9-1), and on receipt, exposure is put on (9-2) and at the same time, read timing data on main memory previously stored, then set the time of register rollers are turned on (9-3).

Register processing will be described with reference to FIG. 10. Processing in the subroutine is none because mode is set at '3' in the initialization of main routine. However, in the other processing (7-3) which will be described later as shown in FIG. 11, when mode is set at "0" (11-5), in the subroutine of register processing is started.

When mode is set at 0 (10-3), it proceeds for detecting the timing of register rollers are turned on. As the predetermined timing data for the first 10 sheets of printing is stored in the main memory, sequential processing is executed accordingly. Upon detecting that the register rollers are turned on (10-4), set 'Y-1' at the counter Y provided for time measuring and make mode as 1 (10-5).

At the next loop processing, when 'mode-1' is judged (10-2), it proceeds for detecting the timing of the second paper sensor is turned on and judges as to whether the second paper sensor is turned on or not (106). 6). If it is not turned on, add "1" to counter Y and get away from the subroutine.

With the second paper sensor is turned on, input the counter X which stores the number of samplings and decide the memory banking in which the value of counter Y is stored. For instance, when the counter X is "2", the measured value in the counter Y is stored in the memory bank (C-1) of the submemory 24. Thereafter, clear the counter Y and add "1" to the counter X (10-7). Then, judge as to whether the value of counter X is "10" or not (10-8) because the sampling for 10 times is fixed in this embodiment. If the counter X is not "10", return mode to 10 (10-10) and get away from the subroutine. In this manner, the sampling is done for over 10 times in order to measure the time from the register rollers are turned on to the time when the paper sheet reaches the second paper sensor, and store each value in the bank memory from C-0 to C-9 of the submemory 24. The value of counter X becomes "10" when the above sampling is completed, and the judgment at step 10-8 brings Y, whereat 'Mode-2' is set (10-9).

In the next loop, as 'mode-2' is judged (10-1), average the 10 samplings stored in the submemory 24 and store it in the memory bank (C-M) of the main memory 25, then clear the counter X and return the mode to '3' (1012). Thereafter, the data stored in the main memory 25 is used as a timing data from starting exposure to the register rollers are turned on. Thus, the timing data for the register rollers turning on is renewed basing on the actual time measured over 10 sheets of paper, which means the most proper timing data to the machine is stored.

The behavior of each mode in the above register processing is summarized below. Mode "0": Detect the register rollers are turned on and start adding the value of Y, then make mode "1". Mode "1": Continue adding the value of Y until the leading edge of a paper sheet reaches the second paper sensor. At the time when the second paper sensor detect the leading edge of the paper, store the value of Y in the submemory and make the mode "0", and at the same time, addition to the counter X is made, which counts the number of samplings. Then, set mode "2" when the counter X is complied with the predetermined value. Mode '2': Transfer average value of the data stored in the submemory to the main memory, and makes it as a corrected timing data.

The sheet number control in the other processing will now be described referring to FIG. 11. First, judge as to whether or not one sheet of paper has discharged by a discharge sensor which detects whether the rear edge of a paper sheet is in existence or not (11-1). Add one to the sheet number counter when one sheet of paper is discharged (11-2), and judge as to whether or not the sheet number counter shows 1000. If it is not reached 1000, make it return, if it reached 1000, return the sheet number counter to "0" (11-4) and set the mode "0" (11-5), by which the register processing is started. By the processing described above, 10 samplings out of every 1000 sheets of paper fed are obtained and used as corrected data.

The relations between the timing data and timer setting value of turning on of the reister rollers will be described referring to FIG. 4. The timing data stored in the main memory 25 corresponds to the data of the measured time which covers the time the leading edge of a paper sheet reaches the second paper sensor 7 after the leading edge of the paper left the register rollers 6, and the data corresponds with the time the leading edge of the paper moves the distance d. Transformation into the time from starting exposure to the register rollers are turned on is done as follows. The above Equation (1): $T=(a-d)/X-c/X$ The measured time should be substituted for the term $c/X$, and the timer setting value Tc after correction will become: $Tc=(a-d)/X-(\text{measured time})$ If a cycle of a loop is assumed as n msec, the data comes out; $Td=(a-d)/nX-(\text{value of main memory})$, wherein Td represents a data which will be set for turning on the register rollers. The processing is done just before the register rollers on timing is set in the subroutine of exposure processing at step 9-3.

In this embodiment described above, data is obtained on an average value of over a plurality of samplings, therefore, there will be no deviation in the corrected value, for instance, even if papers are fed from each paper feeding position.

An example was shown in the above embodiment in which corrected data is prepared at a cycle of every 1000 sheets of paper. However, it may be arranged to surely make register correction processing when power is turned on by setting mode at "0" at the time of initialization. It may also be arranged to prepare corrected data by setting a time instead of setting the number of sheets of paper, or to carry out correction processing under the special state at the time when power is turned on as described above. It may further be arranged to carry out correction processing by giving special instructions by operators and servicemen apart from an ordinary processing.

In the above embodiment, example was shown in which the register rollers are turned on after exposure started, however, it may also be applied for correcting exposure start timing when exposure starts after register rollers are turned on.

In the second embodiment of the present invention, the timing correction for transportation of paper sheets or for starting exposure is carried out basing on the data obtained from an average value over a plurality of samplings and renewing the data with new data, instead of the sampling data used in the first embodiment. Hence, proper corrrection can always be made even if various changes are occurred in the condition of paper feeding path.

Figure 10:
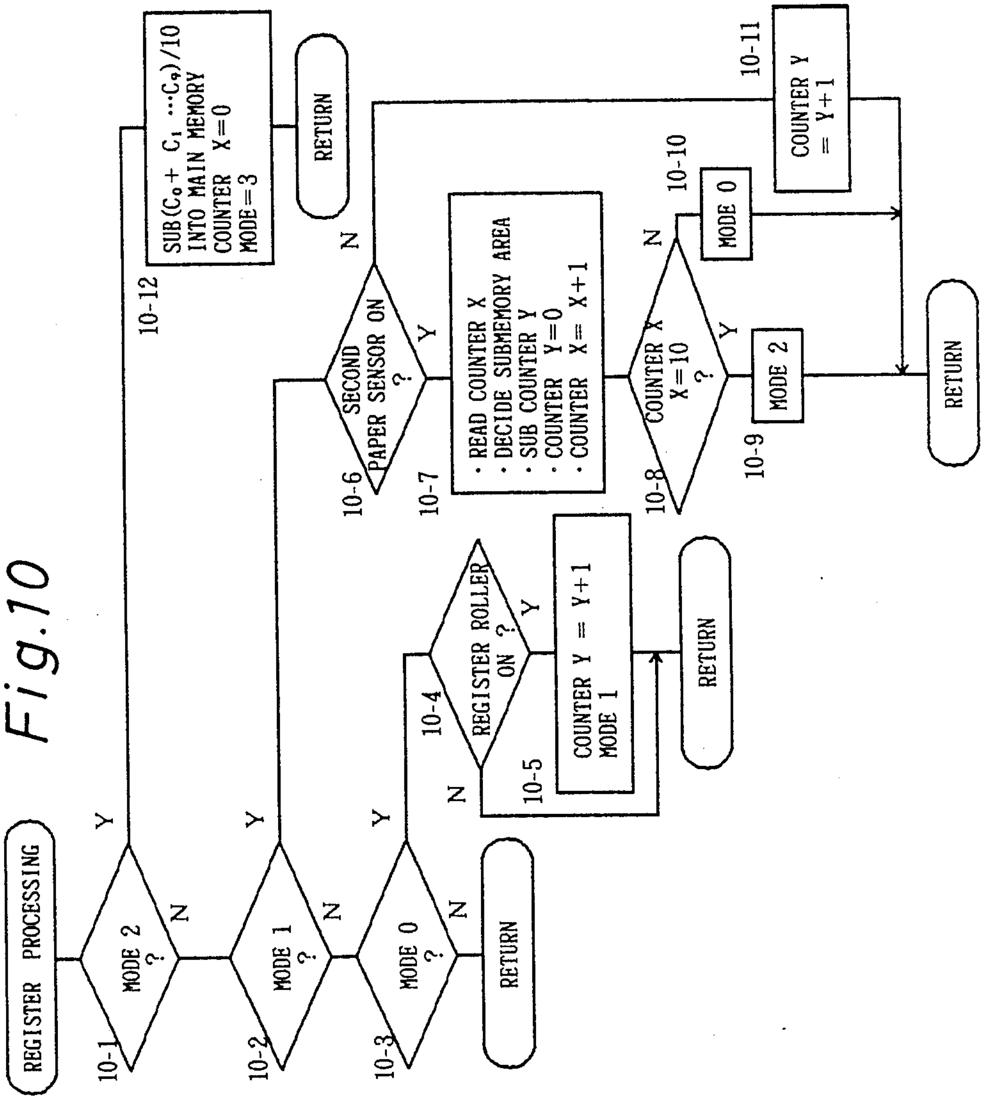
FIG. 10 is a flow chart illustrating a subroutine of register processing in the subroutine in FIG. 7.
Figure 11:
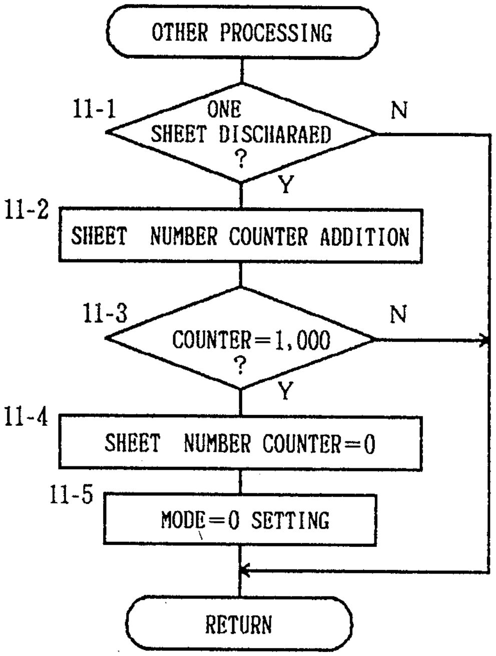
FIG. 11 is a flow chart illustrating a subroutine of other processing in the subroutine in FIG. 7.
Figure 12:
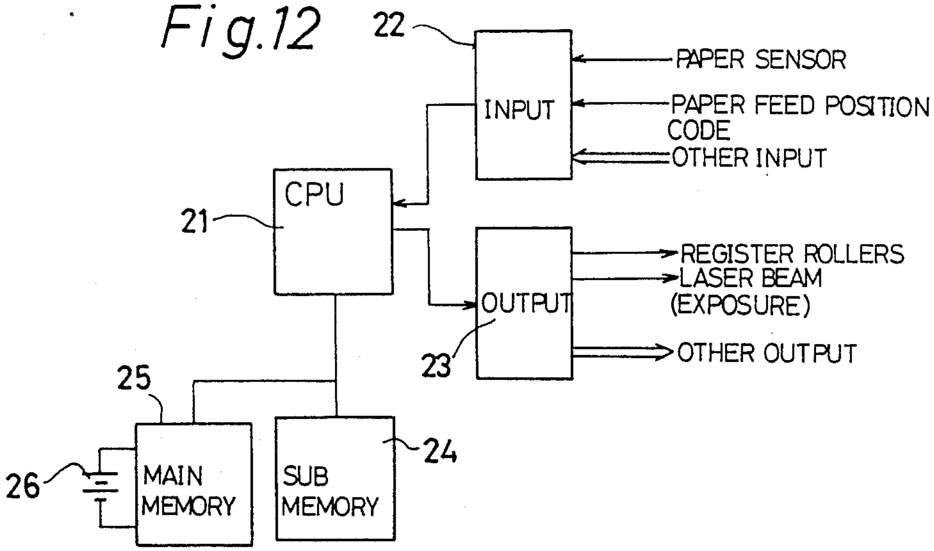
FIG. 12 is a block diagram of control circuit in the third embodiment of the present invention.

The second embodiment of the present invention can thus be fulfilled by making "mode 0" at step 10-12 of the flow chart in FIG. 10 in the first embodiment.

The third embodiment of the present invention, when applied in the laser beam printer as illustrated in FIG. 3, is designed to set the timing for turning on register rollers or for signal emission for starting exposure basing on the measured value obtained from each paper feed position, in which the time is measured from emission of signal to the time when a sensor which is disposed at a rear position of the register rollers and provided for detecting the leading edge of a paper sheet detect the arrival of the leading edge of the paper.

Figure 14:
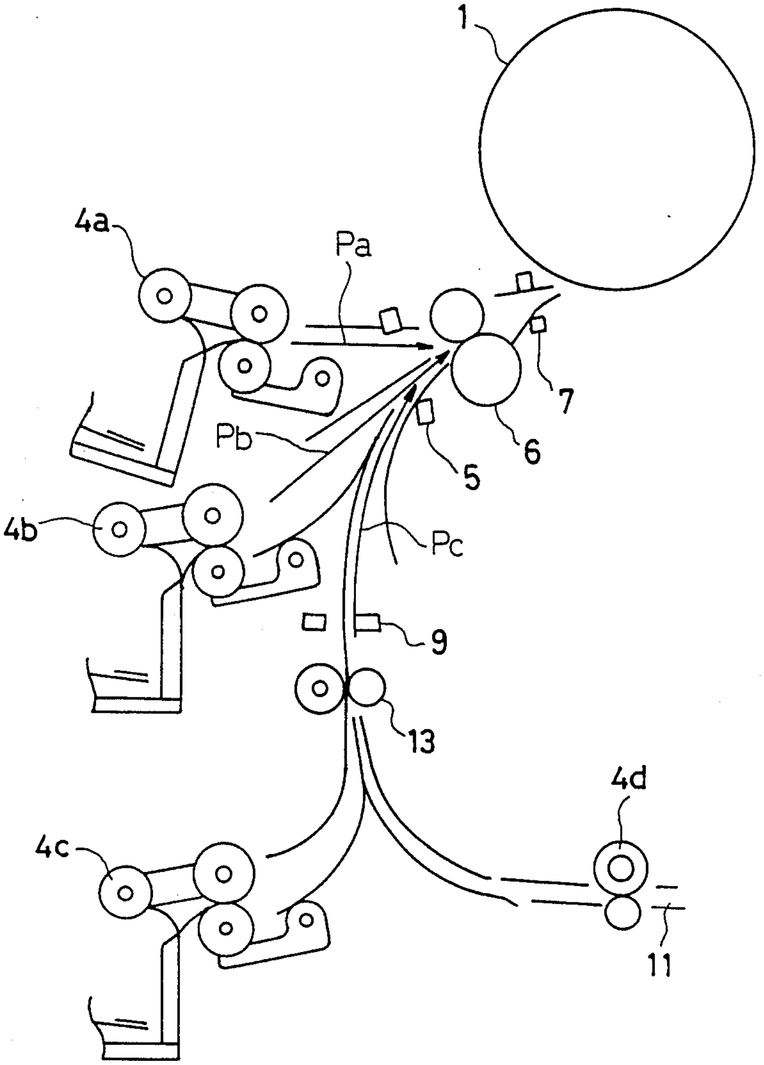
FIG. 14 is an enlarged view illustrating paper feed path of the laser printer in the third embodiment, which is extending from each paper feed position to a photosensitive drum.

Practically, as shown in FIG. 14, T time after detecting the leading edge of paper sheets Pa, Pb, Pc which are fed through paper feed rollers **4*a*–4*c* at a first paper sensor 5, exposure is started by laser beam 2 as in FIGS. 5 and 6**, then the register rollers are turned on T time after starting the exposure, and the T time is corrected by the method described above.

Figure 13:
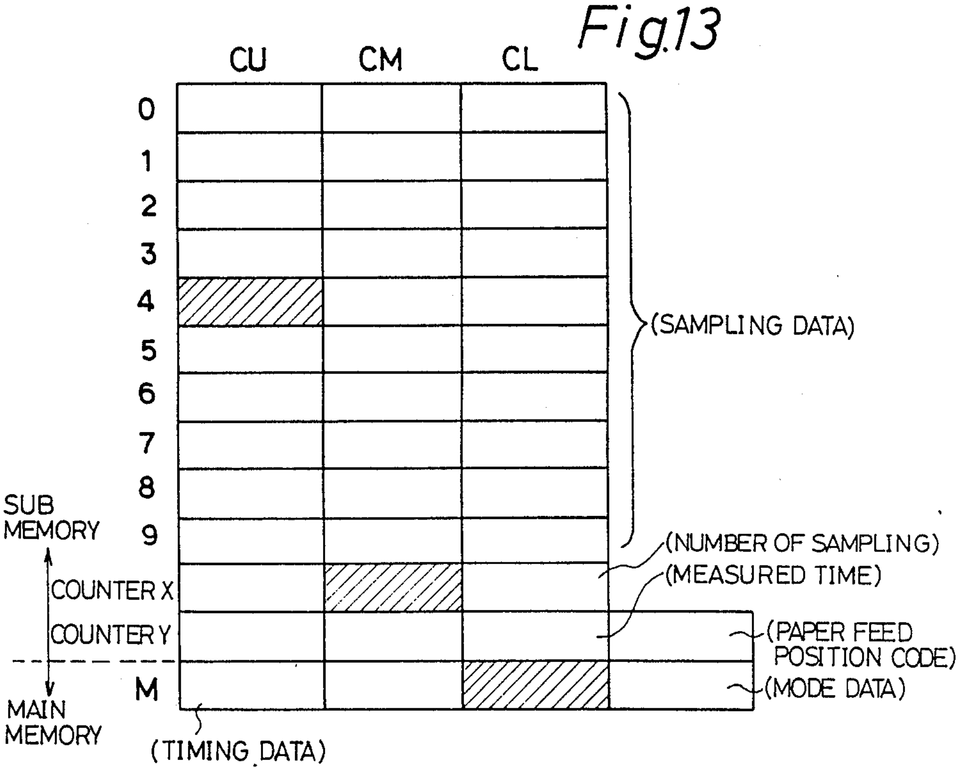
FIG. 13 is a diagram explanatory of memory retaining area of the circuit control in FIG. 12.

The submemory 24, as shown in FIG. 13, is provided with memory storage location (0-9) composed of 10 byte for storing data of 10 samplings corresponding to each paper feed position, counter X for counting the number of samplings, counter Y for storing the measured time value and memory storage location for storing codes of each paper feed position, while main memory 25 is provided with memory storage location M which is composed of 1 byte for storing timing data to turn on register rollers corresponding to each paper feed position and an area for storing mode data for register processing. The main memory 25 is backed up by a battery power 26, and the data stored therein are maintained even if the power is turned off and turned on again. It is also designed to to be controlled by newly corrected data.

In the storage location, labels marked with CU (upper paper feed position), CM (middle paper feed position) and CL (lower paper feed position) are attached to each paper feed position, for instance, the CU4 marked with slant lines shows a storage location which stores the data of fourth sampling in which paper is fed from the upper paper feed position, CMX shows counter X which counts the number of samplings in which paper is fed from the middle paper feed position and CLM signifies a storage location which stores timing data when paper sheets are transported from the lower paper feed position.

The movement by the above composition will now be described. The main control is, however, the same as the main routine in the flow chart shown in FIG. 6 in the first embodiment. The sequential processing and register processing in this main routine are also the same as the subroutine in the flow chart illustrated in FIGS. 7 and 8 in the first embodiment. Explanation on these are, therefore, omitted.

Figure 15:
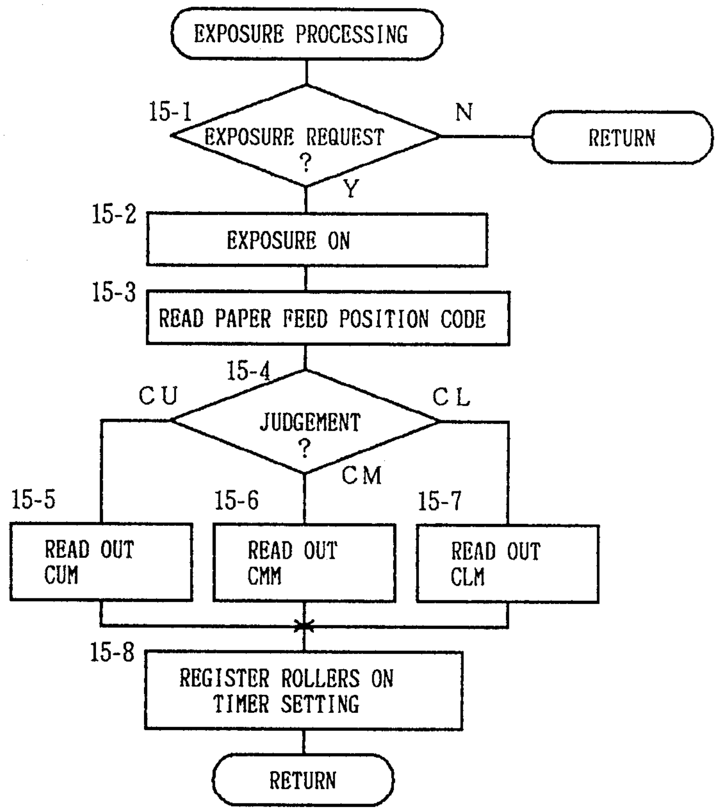
FIG. 15 is a flow chart illustrating a subroutine of exposure processing in the third embodiment of the present invention.
Figure 16A:
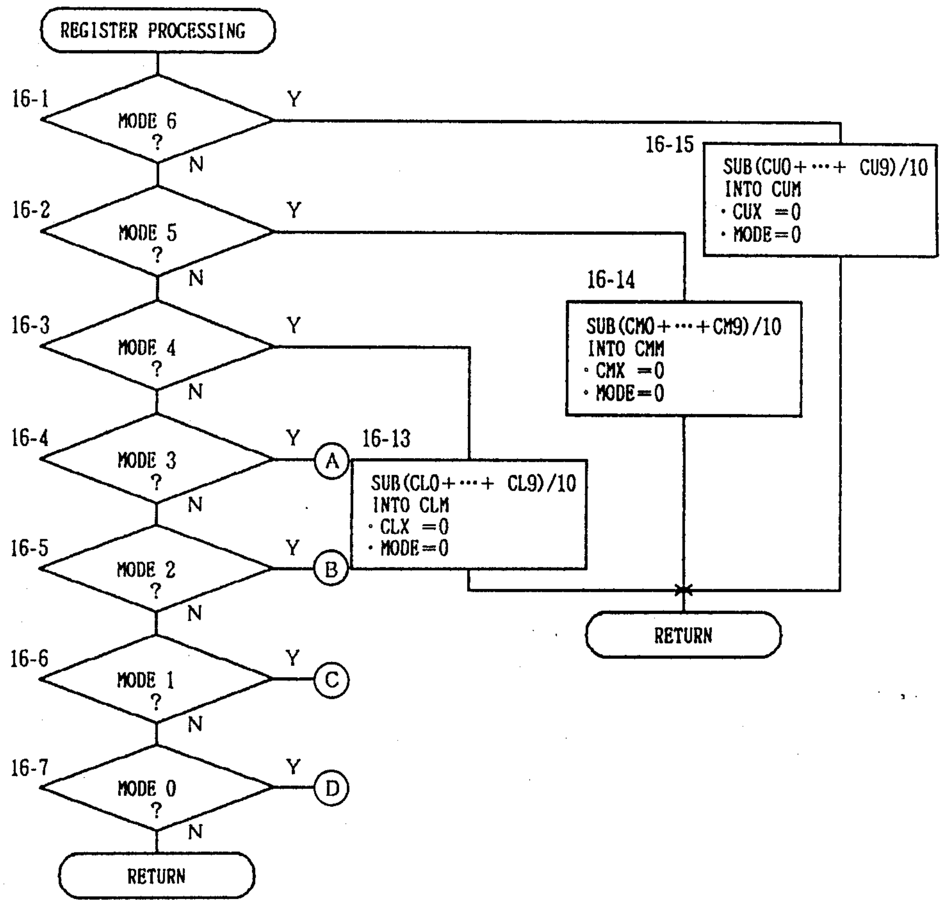
FIGS. 16a through 16e are flow chart showing a subroutine of register processing in the third embodiment.
Figure 16B:
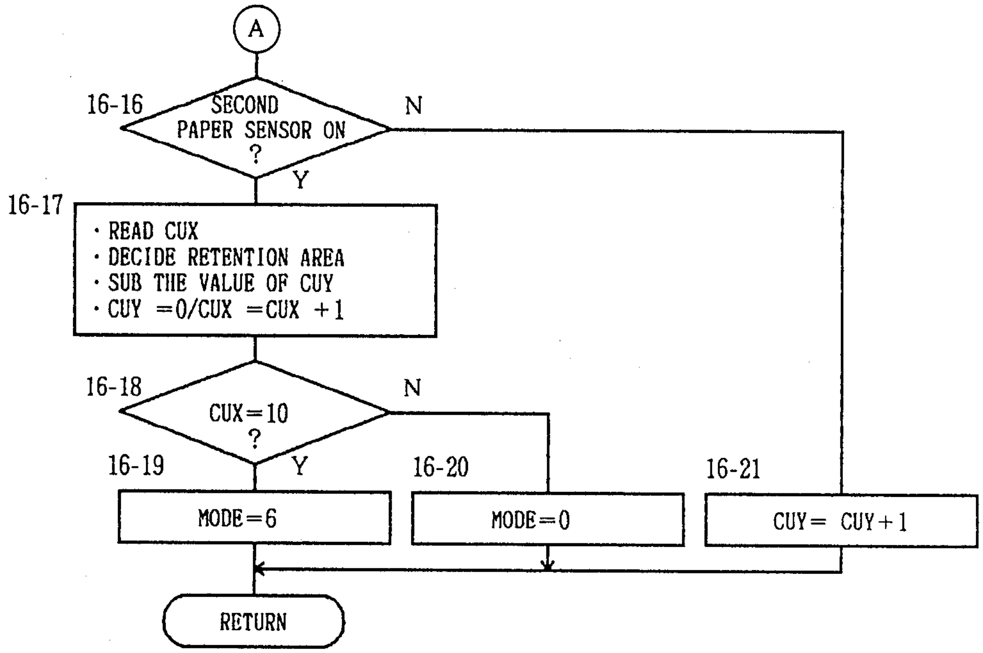
Figure 16C:
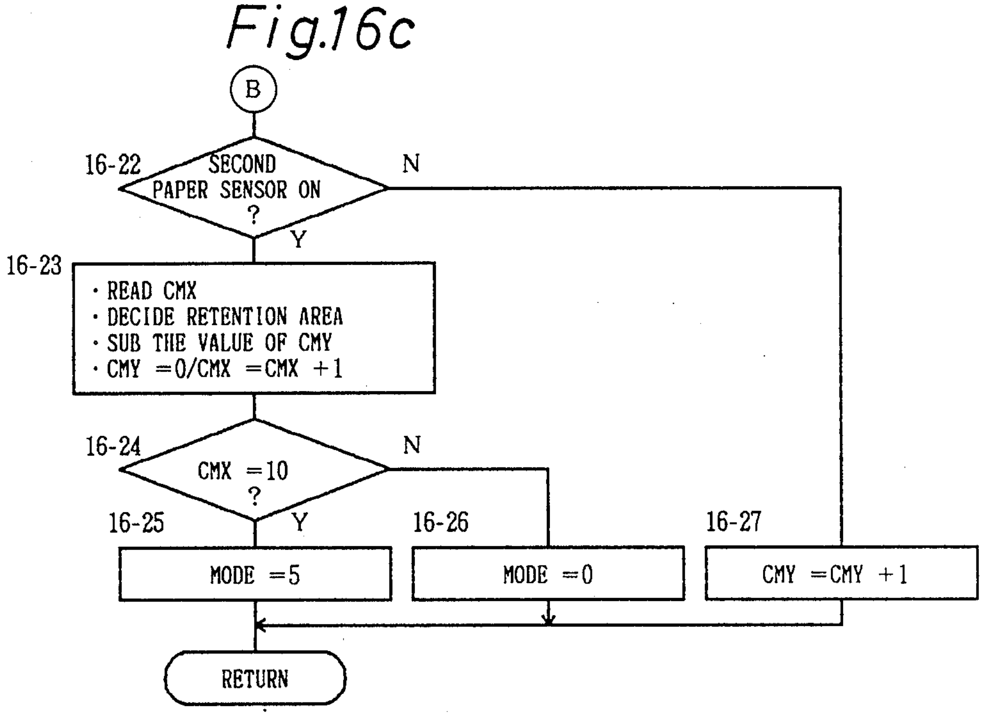
Figure 16D:
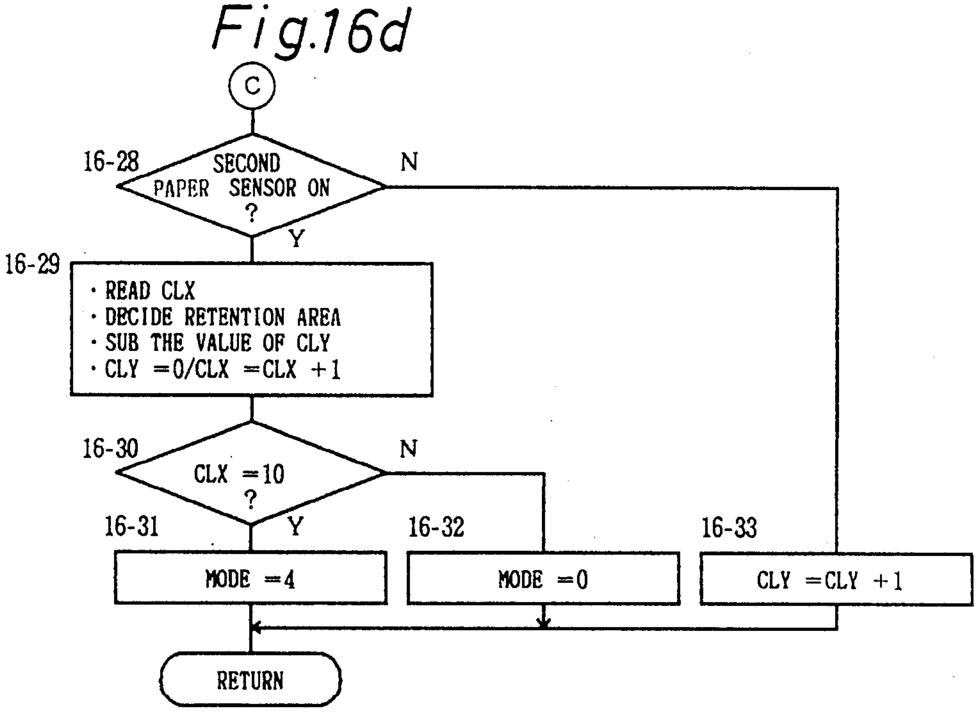
Figure 16E:
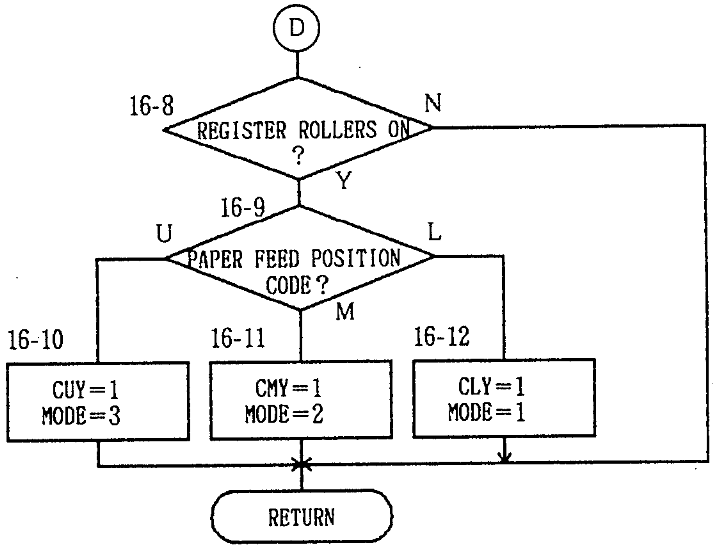

Therefore, the difference in exposure processing and register processing from that of the first embodiment will only be described below. First, exposure processing will be described with reference to FIG. 15. At first, judgement is made as to whether or not exposure request is made (15-1), and if the judgement is 'YES', the exposure is turned on (15-2) and at the same time, read paper feed code (15-3) to judge as to from what paper feed position the paper is being transported (15-4), then in compliance with the judgement, read the timing data previously stored in the main memory 25 to which one of CUM, CMM or CLM it belongs to (15-5 - 15-7), and thereafter, time for turning on register rollers is set (15-8).

Register processing will now be described referring to FIGS. 16*a* through 16*e*. Mode '0' is set at initialization in the main routine, and sequential processing is executed by print request in which subroutine for register processing is also executed.

As the 'mode=0' is set at an initialization (16-7), it proceeeds for detecting the timing of the register rollers turning on. The printing of beginning 10 sheets of paper is processed along the sequential processing since the predetermined timing data is stored in the storage location of CUM, CMM and CLM of the main memory. Upon detecting that the register rollers are turned on (16-8), judgement is made as to from which paper feed posisition a paper is being transported (16-9), and set the timer counters CUY, CYM or CLY at '1' corresponding to each paper feed position and at the same time, set the modes 3, 2 or 1 (16-10–16-12).

Any one of the three paper feed position functions the same and therefore, the lower paper feed position is taken as an example. At the next loop, judgement is made as 'mode=1' (16-6), and proceeds for detecting the timing of the second paper sensor turns on. Judgement is then made as to whether or not the second sensor is turned on (16-28), and if the sensor is not turned on, get away from the subroutine by additing "1" to the counter CLY (16-33).

With the second paper sensor is turned on, decide a storage location for storing sampling data by reading the counter CLX which stores the number of samplings, and stores the value of counter CLY in the storage location. For instance, if the counter CLX stores the value "2", store the measured value of the counter CLY to the storage location CL2 of submemory 24. Then, clear the counter CLY and add "1" to the counter CLX (16-29).

Next, judgement is made as to whether or not the value of the counter CLX is "10" (16-30) since 10 samplings are made in this embodiment. When the counter CLX is not "10", bring it back to mode-0 (16-32) and get away from the subroutine. In this manner, sampling is made over 10 times for measuring time from the rollers are turned to the time when the leading edge of a paper reaches the second paper sensor, and store each value of the sampling in the storage location CL0-CL9 of the submemory 24, on completion of which the value of counter CLX becomes '10' with judgement at step (16-30) as YES and mode=4 is set (16-31).

At the next loop, judgement is made as 'mode=4' (16-3), therefore, averaging the 10 sampling data in the submemory 24, store the data in the CLM storage location of main memory 25. Then, clear the counter CLX and return the mode to '0' (16-13).

Afterward, the data stored in the main memory 25 is utilized as timing data which covers the time from starting exposure to register rollers are turned on. As each one of the paper feed positions is provided with counters CUX, CMX and CLX respectively, each sampling data can be safely stored without using a specified paper feed position for paper feeding of ten sheets of paper successively. Thus, proper timing data can always be maintained to each machine since the timing data for turning on the register roller is renewed and stored every 10 sheets of paper transported.

Timing data and timer setting value for turning on the register rollers will then be described with reference to FIG. 5. The timing data stored in the main memory 25 is a data corresponding to the measured time which covers the time from the leading edge of a paper left the register rollers 6 to the time when the leading edge of the paper reaches the second paper sensor, in other words, it is the value of the machine itself owns which corresponds to the time the leading edge of a paper moves in the distance d. The procedure for transforming it into the time from starting exposure to the register rollers are turned on is omitted since it can be done with the same method as describewd in the first embodiment. The processing is made before timing is set for tuning on the register rollers in the subroutine of exposure processing in the same methods as the first embodiment (within the step 15-8).

In the above embodiment, example was shown in which the register rollers are turned on after exposure started, however, it may also be applied for correcting exposure start timing when exposure starts after register rollers are turned on. Moreover, further arrangement can be made to adjust the leading edge of a paper coresponding to the quality of paper by making sampling according to the quality of paper giving information of not only the paper feed position code but the quality of the paper.

What is claimed is:

1. An image forming apparatus which transfers an image formed on a rotating photosensitive drum onto a moving paper sheet at a transfer position, comprising:
   - a first paper feed means which comprises of a plurality of sheet container sections and feeds paper sheets one by one from one of the sheet container sections selected;
   - a second paper feed means for feeding a paper sheet transported from the first paper feed means to a transfer position;
   - a data storing means provided with storage locations corresponding to each sheet container section having a data to decide a timing to actuate the second paper feed means;

a signal emitting means for giving signals to actuate the second paper feed means basing on the data stored in a storage location corresponding to the sheet container section selected;

a sheet detecting means for detecting the leading edge of a paper sheet being transported into a transfer section by the second paper feed means;

a time measuring means for measuring the time required from giving signal to the detecting means detects the leading edge of a paper sheet;

a data change means for changing a data stored in a storage location corresponding to a sheet container section in accordance with the time measured by the time measuring means.

2. An image forming apparatus as claimed in claim 1, wherein the timing change means changes the timing of signal emission of the signal emitting means corresponding to the time measured by a plurality of samplings.

3. An image forming apparatus as claimed in claim 1, wherein the timing change means starts sampling again after the signal emitting timing is changed.

4. An image forming apparatus as claimed in claim 1, further comprising a controlling means which actuates the timing change means.

5. An image forming apparatus as claimed in claim 4, wherein the controlling means actuates the timing change means when power switch is turned on.

6. An image forming apparatus as claimed in claim 4, wherein the controlling means actuates the timing change means every time the number of paper sheets reached a predetermined number of sheets fed by the paper feed means.

7. An image forming apparatus which transfers an image formed on a rotating photosensitive drum onto a moving paper sheet at a transfer position, comprising:

a paper feed means for feeding a paper sheet to a transfer position;

a data storing means for storing a data to decide a timing for actuating a paper feed means;

a signal emitting means for giving signals to actuate the paper feed means basing on the data stored by the data storing means;

a sheet detecting means for detecting the leading edge of a paper sheet being transported into a transfer position by the paper feed means;

a time measuring means for measuring the time required from giving signal to the detecting means detects the leading edge of a paper sheet;

a data change means for changing the data of the data storing means corresponding to the time measured by the time measuring means.

8. An image forming apparatus which transfers an image formed on a rotating photosensitive drum onto a moving paper sheet at a transfer position, comprising:

a first paper feed means which comprises of a plurality of sheet container sections and feeds paper sheet one by one from one of the sheet container sections selected;

a second paper feed means for feeding a paper transported from the first paper feed means to a transfer position;

a data storing means provided with storage locations corresponding to each sheet container section having a data to decide a timing to actuate the second paper feed means;

a signal emitting means for giving signals to actuate the second paper feed means basing on the data stored in a storage location corresponding to the sheet container section selected.

9. An image forming apparatus which transfers an image formed on a rotating photosensitive drum onto a moving paper sheet at a transfer position, comprising:

a sheet containing means for sending out a plurality of paper sheets one by one;

a paper feed means for feeding said paper sheets being sent out from the paper containing means to the transfer position;

a first sheet detecting means located between the sheet containing means and the paper feed means for detecting a leading edge of a paper sheet being sent out from the sheet containing means;

a data memorizing means for memorizing data referring to a time from detecting the leading edge of a paper sheet by the first sheet detecting means to actuating the paper feed means;

a signal emitting means for emitting signals which actuate the paper feed means on the basis of the data memorized in the data memorizing means;

a second sheet detecting means for detecting the leading edge of the paper sheet being sent out to the transfer position from the paper feed means;

a time measuring means for measuring the time from when a signal is emitted from the signal emitting means until the second detecting means detects the leading edge of a paper sheet; and a data change means for changing the data memorized in the data memorizing means on the basis of the time in the time measuring means.

10. An image forming apparatus as claimed in claim 9, wherein when the above mentioned first sheet detecting means misses a detection of a sheet the actuation of the signal emitting means is prohibited.

11. An image forming apparatus as claimed in claim 9, wherein the data change means changes the timing of signal emission of the signal emitting means corresponding to the time measured by a plurality of samples.

12. An image forming apparatus as claimed in claim 9, wherein the data change means starts sampling again after the signal emitting timing is changed.

13. An image forming apparatus as claimed in claim 9, further comprising a controlling means which actuates the data change means.

14. An image forming apparatus as claimed in claim 12, wherein a controlling means actuates the data change means when power is turned on.

15. An image forming apparatus as claimed in claim 12, wherein the controlling means actuates the data change means every time the number of paper sheets reaches a predetermined number of sheets fed by the paper feed means.

* * * * *

UNITED STATES PATENT AND TRADEMARK OFFICE

CERTIFICATE OF CORRECTION

PATENT NO. : 4,956,651

DATED : September 11, 1990

INVENTOR(S) : Kiyoshi EMORI

It is certified that error appears in the above-identified patent and that said Letters Patent is hereby corrected as shown below:

ON TITLE PAGE:
[54] IMAGE FORMING APPARATUS WITH SHEET DETECTION AND TIMING CONTROL

Signed and Sealed this

Twenty-sixth Day of November, 1991

*Attest:*

HARRY F. MANBECK, JR.

*Attesting Officer* *Commissioner of Patents and Trademarks*